United States Patent
Horst et al.

(10) Patent No.: US 7,236,859 B2
(45) Date of Patent: Jun. 26, 2007

(54) REMOTE CONTROL SYSTEM FOR A LOCOMOTIVE

(75) Inventors: Folkert Horst, Pierrefonds (CA); Stephan P. Georgiev, St-Hubert (CA); Brigide Mattar, Ville Mont-Royal (CA)

(73) Assignee: Cattron Intellectual Property Corporation, Sharpsville, PA (US)

( * ) Notice: Subject to any disclaimer, the term of this patent is extended or adjusted under 35 U.S.C. 154(b) by 142 days.

(21) Appl. No.: 10/754,525

(22) Filed: Jan. 12, 2004

(65) Prior Publication Data

US 2004/0143374 A1 Jul. 22, 2004

Related U.S. Application Data

(63) Continuation-in-part of application No. 10/328,517, filed on Dec. 23, 2002, now Pat. No. 6,799,098, which is a continuation-in-part of application No. 10/222,560, filed on Aug. 16, 2002, now Pat. No. 6,697,716, which is a continuation of application No. 09/653,651, filed on Sep. 1, 2000, now Pat. No. 6,466,847.

(51) Int. Cl.
*G01L 17/00* (2006.01)
*B60L 3/00* (2006.01)

(52) U.S. Cl. ............... 701/19; 381/110; 246/187 A

(58) Field of Classification Search ............ 701/19; 381/110; 340/825.25; 341/176; 704/275, 704/246; 246/187 A, 187 B, 187 C, 3, 4, 246/5, 2 R
See application file for complete search history.

(56) References Cited

U.S. PATENT DOCUMENTS

| | | | |
|---|---|---|---|
| 4,462,080 A * | 7/1984 | Johnstone et al. | 704/200 |
| 4,641,292 A | 2/1987 | Tunnell et al. | |
| 4,725,956 A | 2/1988 | Jenkins | |
| 4,872,195 A | 10/1989 | Leonard | |
| 4,893,240 A | 1/1990 | Karkouti | |
| 5,039,038 A * | 8/1991 | Nichols et al. | 246/3 |
| 5,511,749 A | 4/1996 | Horst et al. | |
| 5,685,507 A | 11/1997 | Horst et al. | |
| 5,774,841 A * | 6/1998 | Salazar et al. | 704/225 |
| 5,832,440 A | 11/1998 | Woodbridge et al. | |
| 6,012,029 A * | 1/2000 | Cirino et al. | 704/275 |
| 6,128,594 A * | 10/2000 | Gulli et al. | 704/244 |
| 6,449,536 B1 | 9/2002 | Brousseau et al. | |
| 6,456,674 B1 | 9/2002 | Horst et al. | |
| 6,466,847 B1 | 10/2002 | Horst | |
| 6,470,245 B1 | 10/2002 | Proulx | |
| 6,587,824 B1 * | 7/2003 | Everhart et al. | 704/275 |

FOREIGN PATENT DOCUMENTS

| | | |
|---|---|---|
| DE | 197 43 306 | 4/1999 |
| EP | 0 971 330 A1 | 1/2000 |
| JP | 60059901 | 4/1985 |
| WO | WO 99/05015 | 2/1999 |

* cited by examiner

*Primary Examiner*—Dalena Tran

(57) ABSTRACT

A remote control system for a locomotive. The remote control system includes a lead controller and follower controller connected to one another over a wireless communication link. The lead controller issues commands over the wireless communication link and those commands are implemented by the follower controller mounted on-board the locomotive. The lead controller is responsive to voice commands uttered by the operator.

46 Claims, 3 Drawing Sheets

REMOTE CONTROL SYSTEM FOR A LOCOMOTIVE

CROSS REFERENCE TO RELATED APPLICATIONS

This application is a continuation-in-part of U.S. patent application Ser. No. 10/328,517 filed Dec. 23, 2002 now U.S. Pat. No. 6,799,098, which is a continuation-in-part of U.S. patent application Ser. No. 10/222,560 filed Aug. 16, 2002 now U.S. Pat. No. 6,697,716, which is a continuation of U.S. patent application Ser. No. 09/653,651 filed Sep. 1, 2000 and issued Oct. 15, 2000 as U.S. Pat. No. 6,466,847. The contents of the above documents are incorporated herein by reference.

FIELD OF THE INVENTION

The invention relates to locomotive remote control technology.

SUMMARY OF THE INVENTION

Under a first broad aspect, the invention provides a lead controller for use with a remote control system for a locomotive. The lead controller comprises an input for receiving a signal containing speech information. A processing unit receives the speech information and performs speech recognition to generate speech recognition results. The processing unit uses the speech recognition results to produce a command for execution by the locomotive. The lead controller also has a communication link interface and is operative for transmitting the command to be executed by the locomotive over a wireless communication link.

In a second broad aspect, the invention provides a remote control system for a locomotive that has a lead controller remote from the locomotive and a follower controller designed to be mounted in the locomotive. The lead controller can wirelessly transmit information to the follower controller. The lead controller includes an input for receiving a signal derived from a spoken utterance and containing speech information. The remote control system has a processing unit for performing speech recognition on the speech information contained in the signal and uses the speech recognition results to produce a command to be executed by the locomotive.

In a third broad aspect, the invention provides a lead controller for use with a remote control system for a locomotive. The lead controller comprises an input interface for receiving a distance command. The lead controller also has a communication link interface for transmitting the distance command to be executed by the locomotive over a wireless communication link.

In a fourth broad aspect, the invention provides a remote control system for a locomotive that has a lead controller remote from the locomotive and a follower controller to be mounted in the locomotive. The lead controller has an input interface for receiving from a human operator a distance command. The lead controller also has a communication link interface for transmitting the distance command over a wireless communication link. The follower controller is responsive to the distance command sent over the wireless communication link to cause the locomotive to execute the distance command.

In a fifth broad aspect, the invention provides a lead controller for use with a remote control system for a locomotive. The lead controller comprises an input interface for receiving a target location command. The lead controller also has a communication link interface for transmitting the target location command to be executed by the locomotive over a wireless communication link.

In a sixth broad aspect, the invention provides a remote control system for a locomotive that has a lead controller remote from the locomotive and a follower controller to be mounted in the locomotive. The lead controller has an input interface for receiving from a, human operator a target location command. The lead controller also has a communication link interface for transmitting the target location command over a wireless communication link. The follower controller is responsive to the target location command sent over the wireless communication link to cause the locomotive to execute the target location command.

In a seventh broad aspect, the invention provides a lead controller for use with a remote control system for a locomotive pulling a train. The lead controller comprises an input interface for:
(a) receiving a command for execution by the train;
(b) a parameter of the train.

The lead controller has a communication link interface for transmitting the parameter of the train and the command to be executed by the train over a wireless communication link.

In an eight broad aspect, the invention provides a remote control system for a locomotive that has a lead controller remote from the locomotive and a follower controller to be mounted in the locomotive. The lead controller includes an input interface for receiving:
(a) a command for execution by the train;
(b) a parameter of the train.

The remote control system has a communication interface for transmitting the command and the parameter of the train over a wireless communication link. The follower controller is responsive to the command and to the parameter of the train sent over the wireless communication link to cause the train to execute the command by implementing actions conditioned at least in part on the parameter of the train.

In a ninth broad aspect, the invention provides a lead controller for use with a remote control system for a locomotive riding on a track. The lead controller comprises an input interface for:
(c) receiving a command directing the locomotive to perform a certain action;
(d) a parameter of the track.

The lead controller has a communication link interface for transmitting the parameter of the track and the command for execution by the locomotive over a wireless communication link.

In an tenth broad aspect, the invention provides a remote control system for a locomotive traveling on a track, that has a lead controller remote from the locomotive and a follower controller to be mounted in the locomotive. The lead controller includes an input interface for receiving:
(c) a command for execution by the locomotive;
(d) a parameter of the track.

The follower controller is responsive to the command and to the parameter of the track transmitted over the wireless communication link to cause the locomotive to execute the command by implementing actions conditioned at least in part on the basis of the parameter of the track.

BRIEF DESCRIPTION OF THE DRAWINGS

A detailed description of examples of implementation of the present invention is provided hereinbelow with reference to the following drawings., in which.

Figure 1:
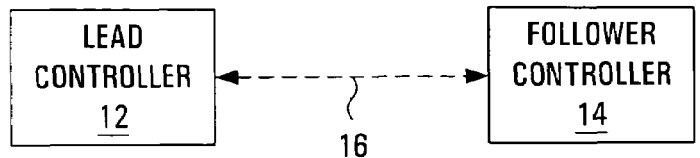
FIG. 1 is a block diagram of a remote control system for a locomotive.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

A non-limiting example of implementation of the present invention is illustrated in FIG. 1 of the drawings. In particular, FIG. 1 illustrates a remote control system for a locomotive. The remote control system includes two main components, namely a lead controller 12 and a follower controller 14 that are linked to one another by a wireless communication link 16.

In use, an operator dials in commands at the lead controller 12 and those commands are relayed to the follower controller mounted on-board the locomotive. The follower controller will process the commands and issue local signals that-are applied to the locomotive such as to implement the commands specified by the operator.

Figure 2:
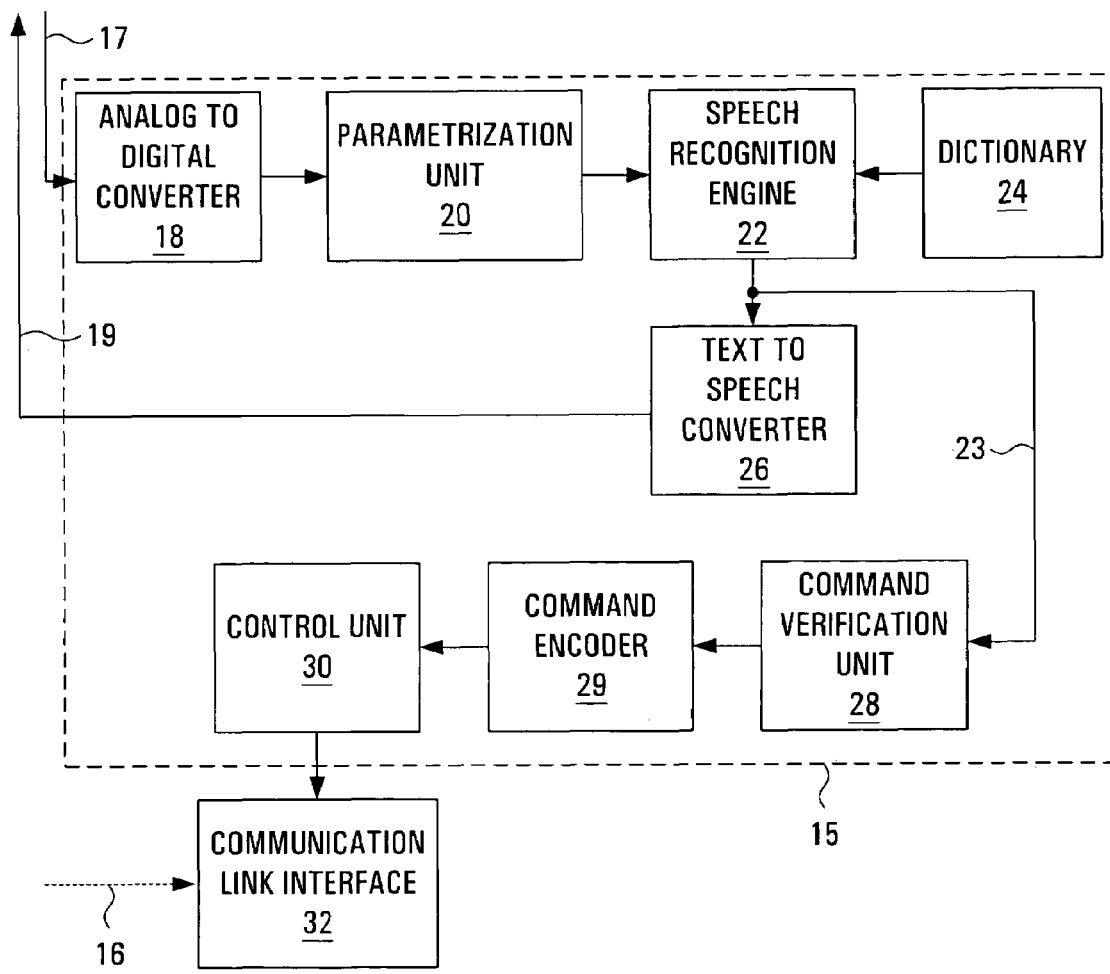
FIG. 2 is a block diagram of the lead controller of the remote control system for a locomotive depicted in FIG. 1.

A detailed block diagram of the lead controller 12 is shown in FIG. 2. The lead controller includes an input interface (not shown) for receiving commands from the operator as to desired actions to be executed by the locomotive or certain parameters about the train pulled by the locomotive or about the track on which the locomotive or train is moving. The input interface refers broadly to the agency on the lead controller 12 on which commands and parameters can be input without any limitation to the specific input devices used. The input devices may comprise keys, switches, knobs or levers that must be displaced, depressed, or otherwise mechanically operated by the operator to dial in commands or parameters. Alternatively, the input interface may include a pointing device, a touch sensitive screen or a voice input. In the specific example described in this application, the input interface has a voice input allowing the operator to enter commands or parameters via voice. In a non-limiting example of implementation, the voice input includes a microphone.

In addition to the input interface, lead controller 12 includes a processing unit 15 and a communication link interface 32. The processing unit 15 has an input that receives a signal conveying speech information. In practice, if the voice input device on the input interface is a microphone, the input 17 could be the output from the microphone. The signal at the input 17 is of analog nature. That signal is applied to an analog-to-digital converter 18 that digitizes the signal according to a Pulse Code Modulation (PCM) technique or according to any other suitable method. The stream of PCM samples released from the analog-to-digital converter 18 are applied to a parameterization unit 20 whose task is to extract from the audio signal containing the speech information significant features on which further speech processing can be performed.

Examples of speech feature elements include feature vectors, spectral parameters, audio signal segments, band energies and cepstral parameters, among others.

It is not deemed necessary to describe in detail the structure and operation of the parameterization unit 20 since such component is well known to those skilled in the art.

The feature elements extracted by the parameterization unit 20 are passed to a speech recognition engine 22. Any suitable commercially available speech recognition engine can be used without departing from the spirit of the invention. The speech recognition engine 22 works in conjunction with a speech recognition dictionary 24 that contains a list of vocabulary items that the speech recognition engine 22 can recognize. In use, when the speech recognition engine 22 receives the feature elements generated by the parameterization unit 20, it generates at output 23 data that represents the vocabulary item best matching the spoken utterance characterized by the feature elements.

The vocabulary items held in the speech recognition dictionary 24 reflect the commands that the lead controller 12 should be able to recognize.

For better recognition performance, the speech recognition engine 22 is speaker dependent. In other words, the speech recognition engine 22 should be trained from speech tokens from a specific speaker such that the speech recognition engine better adapts to the characteristics of the speaker. Alternatively, at speaker independent speech recognition engine can be used without departing from the spirit of the invention.

The recognition results are released by the speech recognition engine 22 on the output 23. In one specific example, the recognition results are the vocabulary item found as being the best match to the spoken utterance, expressed in orthographic form. Other types of representations of the recognition results can be used without departing from the spirit of the invention.

The recognition results are input in a text to speech converter 25 that synthesizes an audio signal released on the output 19 to audibly play to the user the recognition result. This mechanism is provided as a safety feature to allow the operator to abort a command in cases when the recognition results are incorrect. In a specific non-limiting example of implementation, the audio signal released from the text-to-speech converter is in analog form. The analog signal is then passed to a suitable amplifier (not shown in the drawings) and a suitable speaker (not shown in the drawings) such as to audibly play the synthetic speech to the operator.

Any suitable text-to-speech converter could be used without departing from the spirit of the invention. In light of the fact that text-to-speech converters are generally known in the art it is not deemed necessary to describe them here in detail.

Instead of communicating audibly to the operator the recognition results for verification purposes, the lead controller 12 can visually communicate those results to the operator. For example, the lead controller 12 can be provided with a display on which the recognition results are shown.

The output 23 is also applied to a command verification unit 28. The command verification unit gates the recognition results. If a confirmation has been received from the operator within a specified time period that the recognition result is accurate, the command verification unit 28 will release the recognition result for further processing. If no positive input has been received from the operator within the specified time period or a negative input has been received from the operator, the command verification unit 28 deletes or otherwise negates the recognition results applied at its input.

In one specific example, the command verification unit 28 will release the recognition results only if the operator has uttered the word "yes" within a certain time frame after reception of the recognition results, say 5 seconds. After the recognition results are input in the command verification unit 28, a timer starts. At the same time, the operator receives from the text-t-speech converter 26 synthesized speech conveying what are the recognition results. If the operator accepts the results, he or she utters "yes". The new spoken utterance is processed as described previously, and assuming a correct recognition the orthographic representation of the word "yes" appears at the output 23 and it is supplied to the command verification unit 28. If the word "yes" is received before the expiration of the 5 seconds interval, the prior recognition results (conveying the original command) are released by the command verification unit 28. If nothing is received by the command verification unit 28 before the timer stops, then the prior recognition results buffered in the command verification unit 28 are deleted. The same operation is performed if any other word than "yes" is received by the command verification unit 28.

In the example of implementation shown in FIG. 2, the architecture of the system is such that the operator will also hear the recognition results from the confirmation utterance, namely the word "yes" (assuming correct recognition). In some applications, this might be desirable. If this feature is not desirable, the system shown in FIG. 2 can be modified such that a control signal is issued from the command verification unit 28 while the timer is counting. The control signal is applied to the text-to-speech converter 26 such as to prevent the converter from operating. After the timer stops, the control signal is no longer generated and the text-to-speech converter 26 is re-activated.

In a possible variant, a confirmation other than a vocal confirmation can be used. For instance, the lead controller 12 can be provided with a button that that operator needs to depress in order to confirm the recognition results. This possibility can be implemented by modifying the command verification unit 28 to release the recognition results when a logic signal derived from the manual actuation of the button is received before the timer stops. This variant is particularly well suited to applications in which the recognition results are communicated to the operator visually instead of audibly.

In another possible variant, the command verification unit 28 will include a speaker verification module allowing to verify that the operator entering the voice command is an authorized user. Prior to using the system, each authorized user will be asked to provide a respective access voiceprint associated to a user identification number. A voiceprint is a mathematical representation the acoustic properties of a spoken utterance. The access voiceprint will be used to grant access to the control system by performing a similarity measurement between the access voiceprint and an input utterance provided by the operator. For increased security, in addition to the identification number and access voiceprint, a speaker verification operation will be performed for each command received from an operator. In this case, command voiceprints for each allowable command will have to be provided by each authorized user prior to using the control system. These command voiceprints are stored in records in a computer readable medium and are associated to respective authorized user via their identification number. Once an operator has been granted access to the control system by his access voiceprint, the corresponding record containing the command voiceprints is extracted and used for subsequent speaker verification operations. Consequently, each spoken utterance indicative of a command received by the control system is verified against the corresponding command voiceprint in the record associated to the given user. Speaker verification units are well-known and will not be further described here. If the operator cannot be verified as an authorized user, the system will issue a message indicating that control access is being denied.

When the recognition results are released from the command verification unit 28, they are passed to a command translator. The purpose of the command translator is to encode the command in a format suitable for processing by the control unit 30 to be described later. Generally stated, the command released by the command validation unit is in orthographic form which is not the best form suited for analysis such as basic sanity checks and other similar operations to be performed by the control unit 30.

In a prior art lead controller, when the operator manually acts on the controls, the commands are encoded and supplied to a control unit. In the present example of implementation, the command translator will convert the command that is orthographic representation to a format normally obtained from typical manually operated controls. This feature allows using a control unit 30 of known design since the control unit 30 will receive commands in a format that it can already interpret.

The command translator 29 can be designed around a database that maps the orthographic representation of a command to its encoded form. The size of the database will depend upon the number of possible commands the lead controller 12 is designed to vocally accept.

The control unit 30 receives the encoded command and processes it. One type of processing is to perform a high-level validation or sanity check. For example, when the locomotive is travelling forward and a command is received that specifies a reverse movement, that command is rejected. In general, the control unit 30 is of known construction and it does not need to be described in detail here. For more information, the reader is directed to the U.S. Pat. Nos. 5,511,749 and 5,685,507 that provide more information on this particular point. The contents of these patents in incorporated herein by reference.

Figure 3:
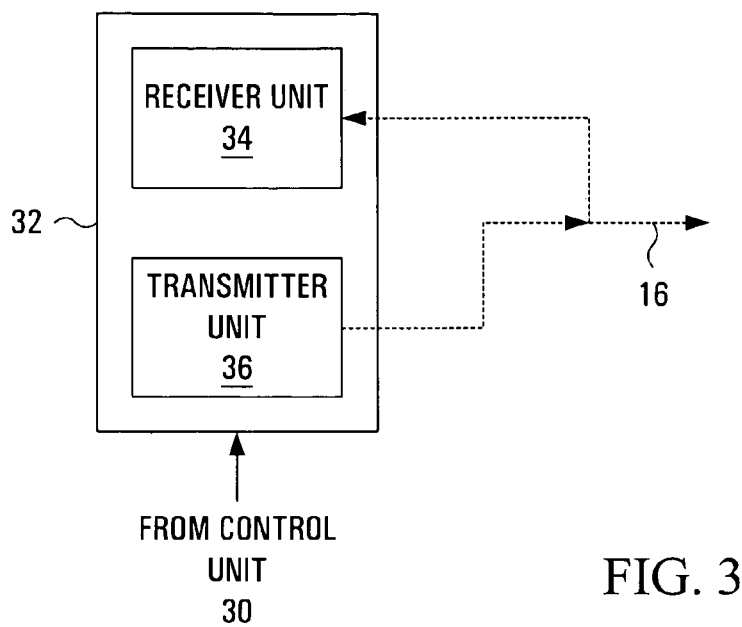
FIG. 3 is a block diagram of a communication link interface of the lead controller shown in FIG. 2.

The output generated by the control unit 30 is passed to the communication link interface 32 such that it can be transmitted to the follower controller 14 over the wireless communication link 16. An example of implementation of the communication link interface is shown in FIG. 3. The communication link interface includes a receiver unit 34 and a transmitter unit 36. Signals issued from the control unit 30 are passed to the transmitter unit 36 for modulation and any other suitable processing such as they can be transported over the wireless communication link 16. Similarly, signals in the wireless communication link 16 directed at the lead controller 12 are passed to the receiver unit 34 for demodulation and they are then passed to the component of the lead control 12 designed to process them.

Figure 4:
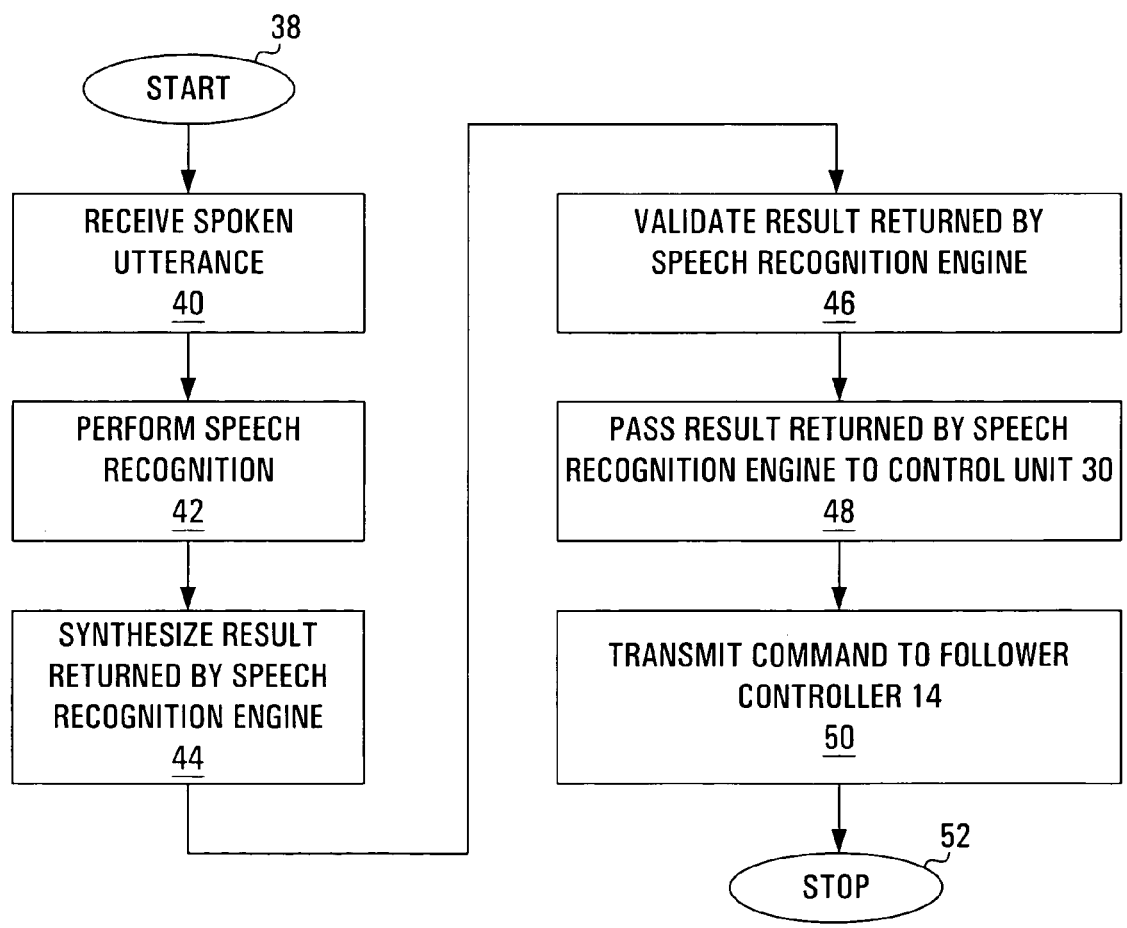
FIG. 4 is a flow-chart illustrating the operation of the lead controller shown in FIG. 2.

FIG. 4 is a flowchart that summarizes the operation of the lead controller 12. At the block 38, the process starts. At step 40, the vocal command uttered by the operator is received at the input 17. At step 42, the spoken utterance is recognized. At step 44, synthetic speech is created and played to the operator to communicate to him the recognition results. At step 46, the recognition results are validated. At step 48, the validated recognition results are passed to the command translator 29 for encoding and then to the control unit 30. At step 50; the command is sent to the follower controller 14 over the wireless communication link 16.

Figure 5:
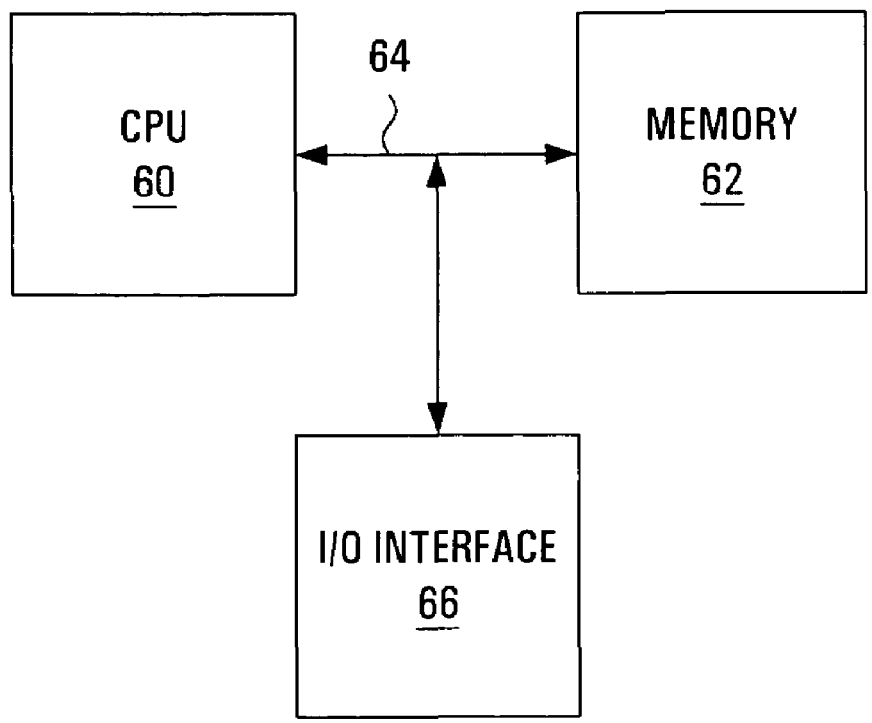
FIG. 5 is a block diagram of a computing platform that can be used to implement some of the components of the remote control system for a locomotive shown in FIG. 1.

The processing unit 15 can in large part be implemented in software executed on a suitable computing platform of the type illustrated in FIG. 5. Such computing platform includes a Central Processing Unit (CPU) 60 connected to a memory 62 over a data bus 64. An Input/Output interface 66 is connected to the data bus 64 and allows the computing platform to exchange signals/data with the external world. The memory 62 is used for holding program instructions of program elements that implement the functionality of components of the processing unit 15. Also, the memory 62 is used to hold data on which the program elements operate.

The structure and operation of the follower controller 14 is not described in detail in this specification. For more information the reader is directed to the U.S. Pat. Nos. 5,511,749 and 5,685,507.

Figure 6:
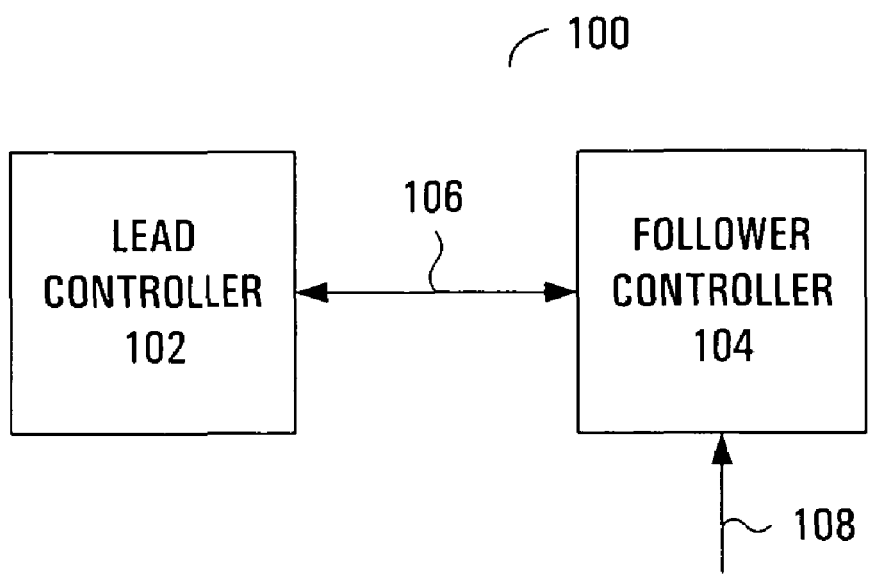
FIG. 6 is block diagram of a remote control system for a locomotive according to a variant.

FIG. 6 illustrates a variant of the remote control system for locomotive 100. The remote control system 100 has a lead controller 102 that is generally similar to the lead controller 12 described earlier and a follower controller 104 that communicates with the lead controller 102 via a communication link 106. The follower controller 104 causes the locomotive to execute a number of functions, including traveling on the track a predetermined distance. The operator can input on the input interface of the lead controller 102 a distance command specifying the distance to travel. Such distance command can be input as a distance value, such as 100 meters for example, or as a parameter that can be resolved by the remote control system 10 to a distance value. Accordingly, for the purpose of this specification, the expression "distance command" or command directing the locomotive to travel a predetermined distance" should be interpreted to cover commands that specify explicitly a distance to be travelled or a command that can be resolved into a distance to be travelled. An example of such a command is a command directing the locomotive to move a predetermined number of car lengths. Since the length of a car is known, the remote control system 100 can compute the total distance the locomotive is to travel by multiplying the average length of a car by the number of cars specified by the operator.

The follower controller 104 uses a distance input in order to determine the actual distance travelled by the locomotive such that when the distance to travel has been reached, the movement can be stopped. There are a wide variety of ways to obtain the distance input, without departing from the spirit of the invention. For example:

(a) The distance input can be obtained internally by processing the output of the velocity sensor mounted on the locomotive that is used to measure the speed of the locomotive. The distance travelled can be determined by integrating the velocity over the time the locomotive is moving.

(b) If the velocity sensor uses a pulse generator, where each pulse corresponds to a certain distance travelled, counting the pulses represents a way to measure distance. Objectively, methods (a) and (b) may introduce errors when the velocity sensor is mounted on a traction wheel of the locomotive and that wheel is subjected to slip.

(c) The distance input can be obtained externally, as shown by the arrow 108, via transponder detection. The locomotive is provided with an antenna that senses transponders placed at predetermined locations along the track. Based on the identity of a given transponder and knowing the location of each transponder, the remote control system can derive the distance traveled by the locomotive between two transponders.

(d) Another way to obtain the distance input externally is via a Global Position System (GPS) that can provide travelled distance information. For higher accuracy a differential GPS system can be used.

In use, when the remote control system receives a distance command, the locomotive either alone or when pulling a train will start moving while monitoring the distance travelled. When the locomotive approaches the end of the track span that corresponds to the distance to be travelled, the locomotive slows down by reduction of power and/or application of brakes such as to stop without exceeding the distance specified by the operator.

In another possible variant, that is also described in conjunction with FIG. 6, the remote control system 100 is designed to receive a target location command, which is a command identifying a location on the track where the locomotive is to stop. In this embodiment, the remote control system 100 tracks the current location of the locomotive and compares it to the target location. When the locomotive is at or near the target location the remote control system 100 causes the locomotive to stop by power reduction and/or application of brakes. The command supplied by the operator provides the information about the target location. For example, a target location command can specify the identity of a transponder and the locomotive will stop when this transponder is reached. Alternatively, the target location command can specify a location by expressing coordinates explicitly or implicitly. For instance, the operator may specify the name of a location that can be resolved to a set of coordinates by the remote control system. Alternatively, the operator may be provided on the input interface with a touch sensitive screen showing a map of the yard where the locomotive rides. The operator may touch or otherwise specify a location on the displayed map. Underlying logic in the lead controller 102 can issue based on this input the coordinates, expressed in any suitable format, of the location specified by the operator.

Once the target location is known, the remote control system 100 can determine when to stop the locomotive by tracking the current position of the locomotive. The current position can be generated from a GPS unit, as depicted by the arrow 108, or by reading a transponder along the track.

In yet another possible variant the remote control system can receive, in addition to commands directing the locomotive to perform a certain function, parameters that can change the way the command is being implemented. For example, the operator may specify parameters about the train being pulled by the locomotive or parameters about the track on which the locomotive is riding. An example of a parameter of the train is the approximate weight of the train or the number of cars in the train. This information can be used by the follower controller to adapt the control logic that is used to regulate the train movement. For instance, in the case of a heavier train, more power can be applied when the operator desired to bring the train to certain speed, than in the case of a lighter train. In a braking scenario, when the operator desires to bring the train to a stop at a certain location, the control logic will apply the brakes earlier than in the case of a lighter train, to avoid the train overshooting the target location. Accordingly, the locomotive is caused to execute commands by implementing actions that are conditioned on the parameter specified by the operator.

The control logic in the follower controller can usually be expressed as a set of transfer functions, each function associated to a certain operation, such as acceleration, coasting, braking, etc. Each transfer function has a number of control parameters. The parameters of the train input by the operator used to modify the control parameters of the relevant transfer function. Which control parameters of the transfer function, and the extent to which they can be modified, is a matter of design choice that can vary significantly from one application to the other.

Another parameter that can be specified by the operator and that can be used to tailor the control logic of the follower controller generally as described earlier, relates to track conditions. For example, the operator can specify the grade (incline) of the track which information can be used modify the control logic to apply more power when the train is going up the track and less power when the train is moving down, due to the gravity effect. Braking can be tailored in a similar manner. Another possible track parameter, among others, is how slippery the track is.

Parameters about the train and track conditions, distance and target location commands can be entered via voice. The speech recognition functionality of the remote control system processes the speech input as required previously to output the relevant command or parameter, which is then processed for implementation. The speech recognition dictionary of the system contains vocabulary items that correspond to the distance and target location commands, train, track or other parameters that the system should be able to recognize, such that when the operator utters one or more of those commands or parameters the speech recognition system will be able find proper matches.

It should be expressly noted that parameters about the train and track conditions, and distance and target location commands could also be specified by the operator by using input devices other than a speech sensing input.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A lead controller for a locomotive, comprising:
   a) an input for receiving a signal containing speech information;
   b) a processing unit for receiving the speech information and performing speech recognition to generate speech recognition results and using the speech recognition results to produce a command for execution by the locomotive;
   c) a communication link interface operative to maintain a wireless communication link with a follower controller in a locomotive for transmitting the command to be executed by the locomotive over the wireless a communication link.

2. A lead controller as defined in claim 1, including a microphone connected to said input.

3. A lead controller as defined in claim 1, wherein the signal containing speech information is derived from a spoken utterance, said processing unit has a speech recognition engine.

4. A lead controller as defined in claim 3, wherein said processing unit includes a speech recognition dictionary including a plurality of vocabulary items, said speech recognition engine being operative to identify amongst the plurality of vocabulary items at least one vocabulary item that is a match to the spoken utterance.

5. A lead controller as defined in claim 3, wherein said processing unit is operative to communicate to a human operator information allowing the operator to ascertain if the processing unit has correctly recognized the speech information.

6. A lead controller as defined in claim 5, wherein the information allows the human operator to ascertain the speech recognition results generated by said processing unit.

7. A lead controller as defined in claim 6, wherein the information allows the human operator to ascertain the at least one vocabulary item identified by said speech recognition engine as being a match to the spoken utterance.

8. A lead controller as defined in claim 6, wherein said processing unit communicates the information to the human operator audibly.

9. A lead controller as defined in claim 8, wherein said processing unit communicates the information to the human operator visually.

10. A lead controller as defined in claim 8, wherein the information is conveyed to the human operator by using synthetic speech.

11. A lead controller as defined in claim 5, wherein said processing unit is responsive to a confirmation signal indicative of a confirmation by the human operator that said processing unit has correctly recognized the speech information to allow the locomotive to execute the command.

12. A lead controller as defined in claim 11, wherein said processing unit is responsive to the confirmation signal indicative of a confirmation by the human operator that said processing unit has correctly recognized the speech information to cause transmission of the command over the communication link.

13. A lead controller as defined in claim 12, wherein the confirmation signal is a signal derived from manual actuation of a control on said lead controller.

14. A lead controller as defined in claim 11, wherein the confirmation signal includes speech information.

15. A lead controller as defined in claim 14, wherein said processing unit is operative to perform speech recognition on the confirmation signal.

16. A lead controller as defined in claim 11, wherein said processing unit prevents execution of the command by the locomotive unless the confirmation signal has been received within a predetermined time period.

17. A lead controller as defined in claim 11, wherein said processing unit negates the speech recognition results when no confirmation signal has been received within a predetermined time period.

18. A lead controller as defined in claim 1, wherein said speech recognition engine is speaker dependent.

19. A lead controller as defined in claim 1, including a speaker verification unit.

20. A read controller as defined in claim 1, wherein said speech input is a distance command.

21. A lead controller as defined in claim 1, wherein said speech input is a target location command.

22. A lead controller as defined in claim 1, further comprising an input interface for receiving:
   a) a command for execution by the train; and
   b) a parameter of the train.

23. A lead controller as defined in claim 1, wherein the locomotive is operative for riding on a track, said lead controller comprising an input interface for receiving a command for execution by the locomotive and a parameter of the track.

24. A remote control system for a locomotive, comprising:
   a) a lead controller remote from the locomotive;
   b) a follower controller for mounting on the locomotive;

c) said lead controller operative for wirelessly transmitting information to said follower controller;
d) an input on said lead controller for receiving a signal containing speech information;
a) a processing unit receiving the speech information and performing speech recognition to generate speech recognition results and using the speech recognition results to produce a command for execution by the locomotive, wherein said processing unit resides in said lead controller.

25. A remote control system as defined in claim 24, wherein said follower controller is responsive to the command for generating local signals for application to the locomotive to cause the locomotive to execute the command.

26. A remote control system as defined in claim 25, including a microphone at said lead controller.

27. A remote control system as defined in claim 25, wherein the signal containing speech information is derived from a spoken utterance, said processing unit has a speech recognition engine.

28. A remote control system as defined in claim 27, wherein said processing unit includes a speech recognition dictionary including a plurality of vocabulary items, said speech recognition engine being operative to identify amongst the plurality of vocabulary items at least one vocabulary item that is a match to the spoken utterance.

29. A remote control system as defined in claim 27, wherein said processing unit is operative to communicate to a human operator information allowing the operator to ascertain if the processing unit has correctly recognized the speech information.

30. A remote control system as defined in claim 29, wherein the information allows the human operator to ascertain the speech recognition results generated by said processing unit.

31. A remote control system as defined in claim 30, wherein the information allows the human operator to ascertain the at least one vocabulary item identified by said speech recognition engine as being a match to the spoken utterance.

32. A remote control system as defined in claim 30, wherein said processing unit communicates the information to the human operator audibly.

33. A remote control system as defined in claim 32, wherein said processing unit communicates the information to the human operator visually.

34. A remote control system as defined in claim 32, wherein the information is conveyed to the human operator by using synthetic speech.

35. A remote control system as defined in claim 29, wherein said processing: unit is responsive to a confirmation signal indicative of a confirmation by the human operator that said processing unit has correctly recognized the speech information to allow the locomotive to execute the command.

36. A remote control system as defined in claim 35, wherein the confirmation signal includes speech information.

37. A remote control system as defined in claim 36, wherein said processing unit is operative to perform speech recognition on the confirmation signal.

38. A remote control system as defined in claim 35, wherein the confirmation signal is a signal derived from manual actuation of a control on said lead controller.

39. A remote control system as defined in claim 35, wherein said processing unit prevents execution of the command by the locomotive unless the confirmation signal has been received within a predetermined time period.

40. A lead controller as defined in claim 35, wherein said processing unit negates the speech recognition results when no confirmation signal has been received within a predetermined time period.

41. A remote control system as defined in claim 24, wherein said speech recognition engine is speaker dependent.

42. A remote control system as defined in claim 24, including a speaker verification unit.

43. A remote control system as defined in claim 24, wherein said speech information includes a distance command.

44. A remote control system as defined in claim 24, wherein said speech information includes a target location command.

45. A remote control system as defined in claim 24, wherein said lead controller further comprises and input interface for receiving:
   a) a command for execution by the train; and
   b) a parameter of the train.

46. A remote control system as defined in claim 24, wherein the locomotive is operative for riding on a track, said lead controller further comprising an input interface for receiving a command for execution by the locomotive and a parameter of the track.

* * * * *